Dec. 1, 1970 W. GASSERT 3,544,169
APPARATUS FOR SUPPLYING WORKPIECES TO A WORKING STATION
Filed Dec. 26, 1968 4 Sheets-Sheet 1
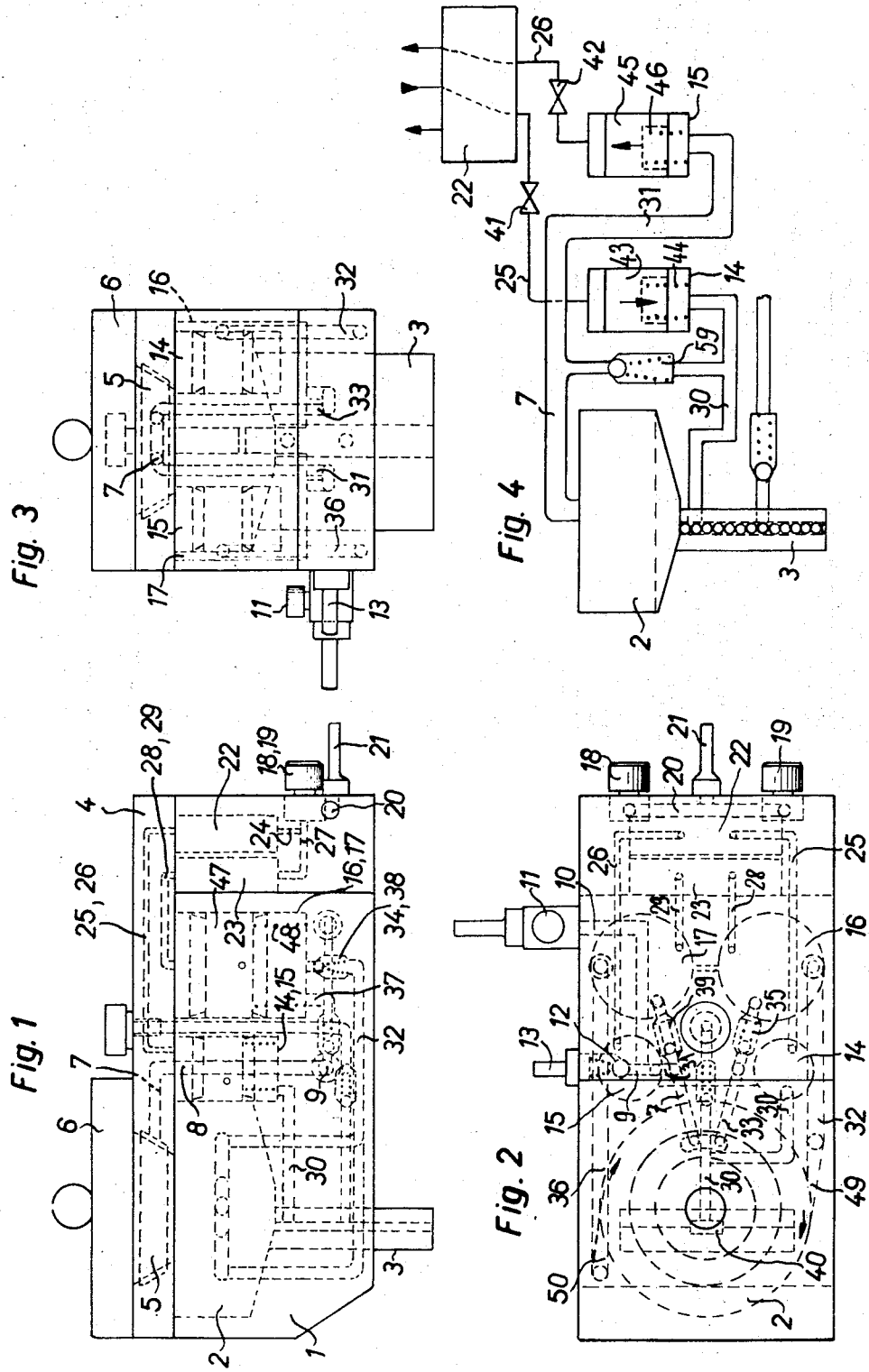

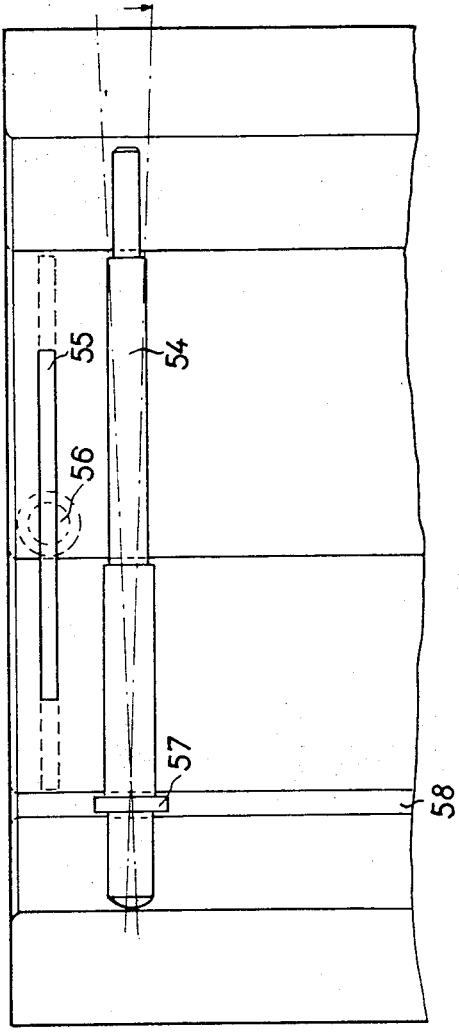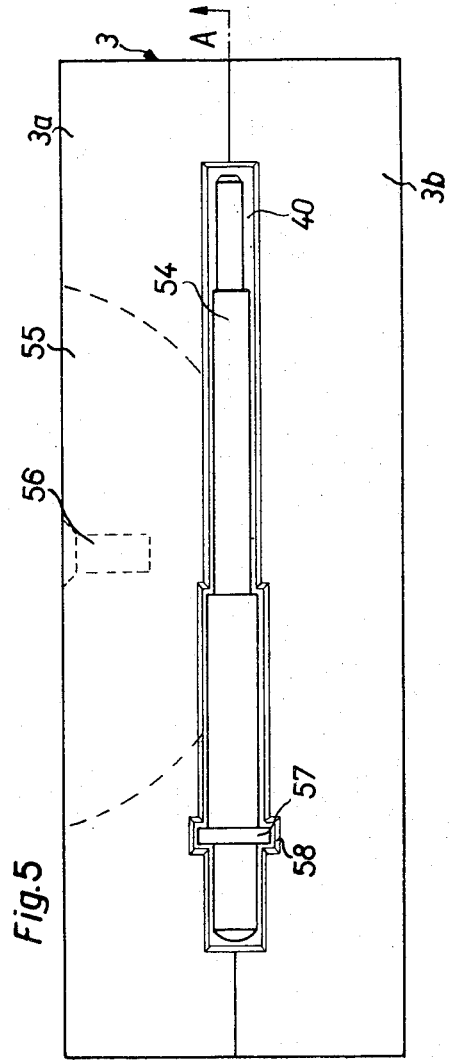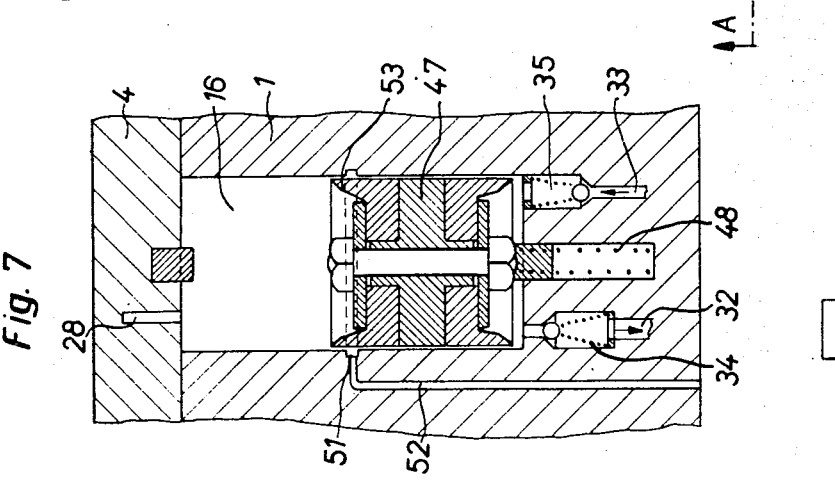

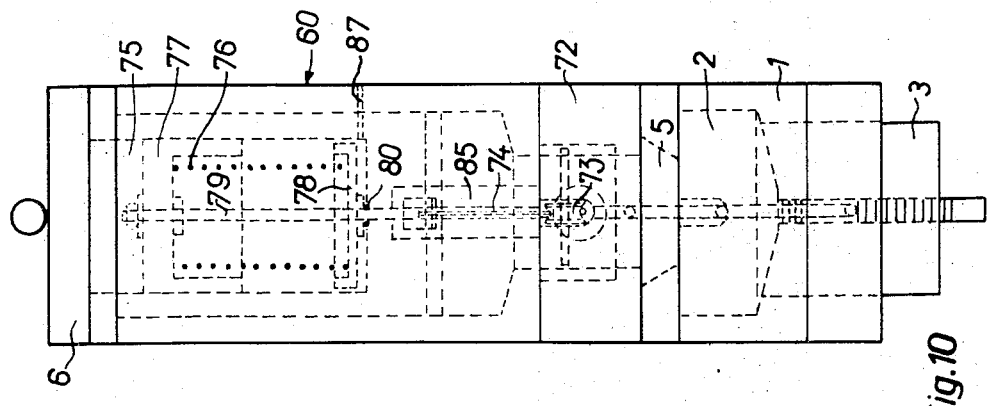
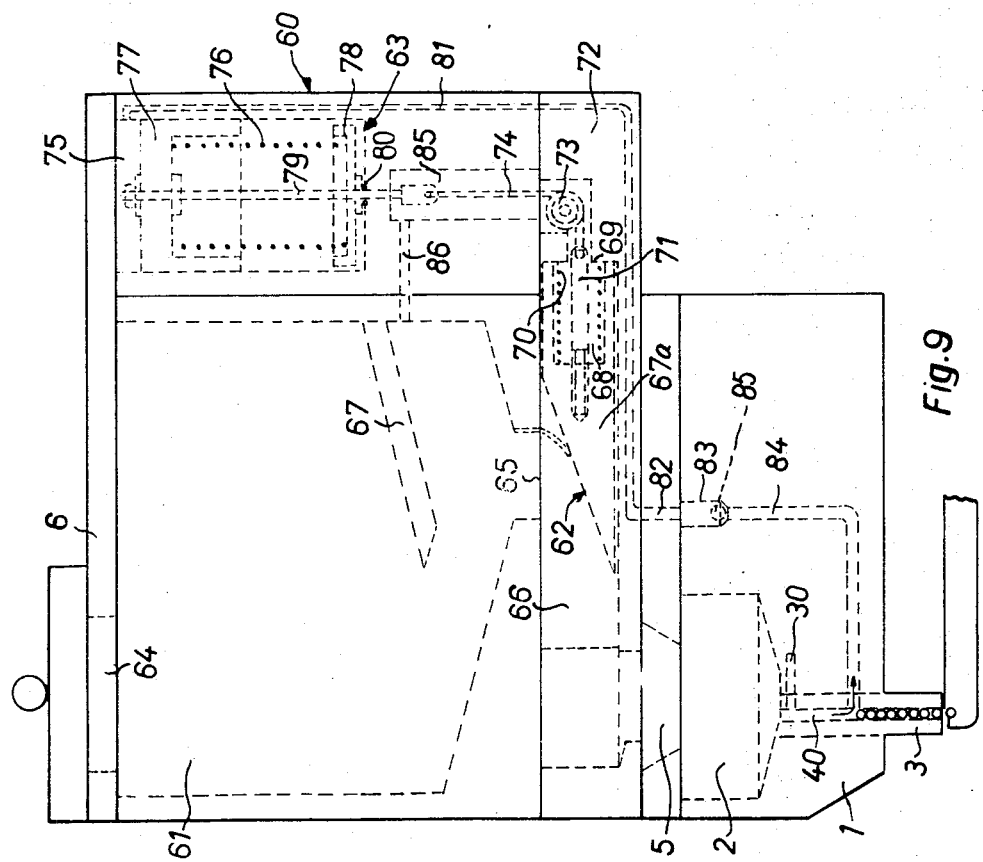

United States Patent Office 3,544,169
Patented Dec. 1, 1970

3,544,169
APPARATUS FOR SUPPLYING WORKPIECES TO A WORKING STATION
Willy Gassert, 59 Hauptgasse, Solothurn, Switzerland
Filed Dec. 26, 1968, Ser. No. 787,128
Claims priority, application Switzerland, Dec. 27, 1967, 18,192/67
Int. Cl. B65g 53/30
U.S. Cl. 302—14                                              8 Claims

ABSTRACT OF THE DISCLOSURE

Apparatus for supplying workpieces to a working station comprises a supply container, a magazine connected to the supply container and provided with a duct for the passage of the workpieces to the working station, said supply container and magazine duct being filled with a liquid. Two cylinders with pressure fluid operated reciprocatory pistons are provided and connected to said supply container and said magazine duct to cause the liquid in the container and the duct to effect a reciprocatory movement to impart a to-and-fro motion to the workpieces in the duct, and two further cylinders with reciprocatory pressure fluid operated pistons are provided and connected to said supply container to cause the liquid in the container to effect a rotary motion. The combined action of the reciprocatory movement of the liquid in the magazine duct and the rotary motion in the supply container assists in facilitating correct loading of the workpieces into the magazine.

---

The present invention relates to an apparatus for supplying workpieces to a work station, consisting of a supply container, a storage magazine connected thereto and a device for automatically loading the magazine with workpieces contained in the suply container, wherein the supply container and the magazine duct are filled with fluid.

Various forms of apparatus of this kind are known. Some examples are apparent from Swiss Pats. No. 271,187, 293,501 and 365,602. However, up until now with all these forms of apparatus, only loading of very small workpieces has been possible.

An object of the present invention is therefore to produce an apparatus whereby workpieces with larger dimensions, particularly those having an elongated form, can be loaded.

The apparatus according to the invention is characterized in that the loading device has at least two pneumatically controlled and actuated cylinders which are connected with the supply container and the magazine duct by way of pipes, so as to cause the fluid in the supply container and the magazine duct to move to-and-fro, so that the workpieces perform a reciprocatory movement in the forward direction as they pass through the magazine duct.

Embodiments of the invention will now be described with reference to the accompanying drawings, in which:

FIG. 1 shows a front view of a device;

FIG. 2 shows a plan view of the device according to FIG. 1;

FIG. 3 shows a side view of the device according to FIG. 1;

FIG. 4 is a detail of part of the device according to FIG. 1;

FIG. 5 is a plan view of a magazine with a longitudinal workpiece inserted therein;

FIG. 6 is a side view of one-half of the magazine taken along the line A—A of FIG. 5;

FIG. 7 is a cross section through a part of the device according to FIG. 1;

FIG. 8 is a plan view of a workpiece;

FIG. 9 is a plan view of another embodiment in which the device according to FIG. 1 is provided with an auxiliary supply container;

FIG. 10 is a side view of the embodiment according to FIG. 9;

Figure 13:
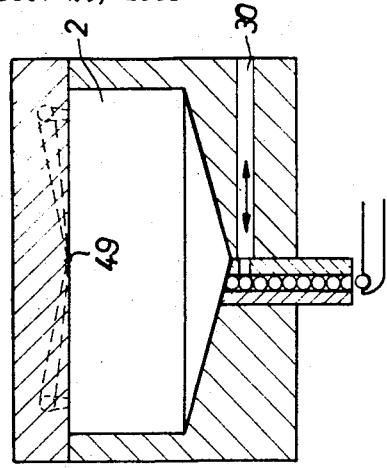
FIGS. 13 and 13a show a cross section and plan view of an auxiliary supply container with a magazine and superposed cover.
Figure 13A:
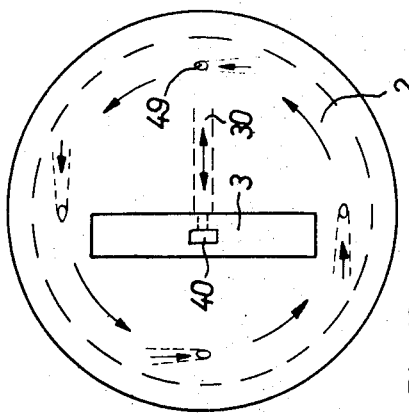

As can be seen from FIGS. 1 to 3, the device consists af a casing 1 in which a supply container 2 is bored. Various other components of the device are also formed in the casing by different bores and recesses. A storage magazine 3 consisting of two parts (see also FIGS. 5 and 6) is screwed on to the lower end of the supply container 2. The casing 1 is provided with a cover 4 in which a filling hole 5 for the supply container 2 is provided. The filling hole 5 can be tightly sealed by means of a detachable lid 6. The supply container 2 is connected with the cooling oil circuit of the machine (not shown) which processes the workpieces, by way of pipes 7, 8, 9 and 10 formed in the cover 4 and in the casing 1, as well as by a stop valve 11. A spring-loaded pressure-relief valve 12 is mounted in the pipe 9 through which the oil is drawn off to the outside via a sleeve 13 when there is an excess pressure in the system. For loading the magazine 3 with workpieces, four pneumatically controlled and actuated upright cylinders 14, 15, 16 and 17 are mounted in the casing 1, the function and method of working of which is described later. The piston of each cylinder rests on a spring supported at the lower end of the cylinder. The springs are so dimensioned that they can stop the pistons in their middle positions when the latter are not under load. The top of each cylinder is connected with a pneumatic control whilst the lower side is filled with the working medium, i.e., oil, and conected with the supply container 2 or the magazine 3. The pneumatic control of the cylinder consists of two stop valves 18, 19 which, one one side, are connected with a compressed air source (not shown) by way of a common pipe 20 and a hosepipe connector sleeve 21. On the other side, each valve 18, 19 is connected with a 4-way control valve 22, 23. The two control valves 22, 23 are similarly constructed. The construction of such a valve is described in my copending application Ser. No. 764,440 and is therefore not further explained. The control valve 22 is connected on the one side with the stop valve 18 by way of a pipe 24 and on the other with the cylinder 14 by way of a pipe 25 and with the cylinder 15 by a pipe 26. The control valve 23 is connected on the one side with the stop valve 19 by way of a pipe 27 and on the other with the cylinder 16 by way of a pipe 28 and with the cylinder 17 by a pipe 29.

The cylinder 14 on the other hand is connected with the storage magazine 3 by way of a pipe 30, whilst the cylinder 15 is connected with the supply container 2 by way of a pipe 31 and the pipe 7. The lower side of the cylinder 16 is connected with the supply container 2 by way of a supply pipe 32 and a return line 33. Nonreturn valves 34, 35 are mounted in the two pipes 32, 33, whereby the two nonreturn valves open in the opposite flow direction. Similarly, the lower side of the cylinder 17 is conencted with the supply container by way of a feed pipe 36 and a return line 37 opening into the pipe 7, whereby a nonreturn valve 38, 39 is likewise mounted in each pipe. The two nonreturn valves 38, 39 likewise work in opposite directions.

The method of working the loading device will now be described. After the supply container 2 has been filled with workpieces, the cover 6 is put on and the filling hole 5 is thereby closed. The stop valve 11 is then opened and the supply container 2, the magazine 3, as well as the pipes (7, 8, 9, 10, 30, 31, 32, 33, 36, 37) connected therewith and the cylinders (14, 15, 16, 17) are all filled with oil. In the event of the oil pressure in this system exceeding the value permitted, the pressure relief valve 12 operates and the oil is drawn off to the outside until the force of the spring of the pressure relief valve exceeds the force of the oil pressure and the valve is again closed. Since, during the operation, the removal of the workpieces from the magazine 3 is always associated with a small loss of oil, the stop valve is always opened so far that this loss of oil is continually compensated.

The loading of the magazine 3 with workpieces is first of all carried out by means of the cylinders 14, 15. The loading process is now explained with reference to the plan view shown in FIG. 4. The sleeve 21 is attached to the compressed air source (not shown) and the stop valve 18 opened. The control piston of the 5-way control valve 22 is disposed in the end position, wherein the compressed air flows through the pipe 25 into the cylinder 14. In the pipe 25 is mounted an adjustable valve 41, through which the duration of time required for building up the pressure necessary for actuating the piston 43 of the cylinder 14, i.e., the compressive force which exceeds the force of the spring 44 and urges the piston 43 downwards, can be controlled. The compressed air now forces down the piston 43 of the cylinder 14 until the former reaches its lower end position. The oil present in the cylinder 14 is displaced through the pipe 30 into the magazine 3 and then from there into the supply container 3. Any workpieces which do not lie correctly at the entrance to the magazine channel 40 and thereby block the channel 40 are thus returned to the supply container 2. Since the entire system is filled with oil, the volume of oil displaced from the cylinder 14 is compressed through the supply container and pipes 7 and 31 into the cylinder 15, so that when the piston 43 reaches its lower end position, the piston 45 of the cylinder 15 reaches its upper end position. The control valve 22 now switches over, whereby the piston 43 of the cylinder 14 is relieved and the compression spring 44 urges the piston 43 upwards. The compressed air now flows from the control valve 22 into the cylinder 15 by way of the pipe 26, in which an adjustable valve 42 is mounted if required. The two valves 41, 42 are so adjusted that resetting of the piston 43 of the cylinder 14 by the spring 44 takes place more quickly than the building up of the pressure necessary for actuating the piston 45 of the cylinder 15. A return current of oil in the magazine channel 40 is thus produced, so that the workpieces lying in the magazine beneath the orifice of the pipe 30 are moved upwards, whilst the workpieces lying correctly in the supply container above the channel 40 are drawn into the magazine. The process lasts only until the piston and the compression spring in the two cylinders balance one another, i.e., the pistons are relieved and kept in their middle positions by the springs. After the pressure necessary for actuating the piston 45 has built up in the cylinder 15, the piston 45 is urged downwards, whereby the oil displaced from the cylinder 15 reaches the cylinder 14 by way of the pipes 31 and 7, the supply container 2, the upper part of the magazine 3 as well as the pipe 30, and urges the piston 43 into its upper end position. The control valve 22 is again switched over and the entire process repeated.

The two other cylinders 16, 17 are provided for causing the fluid in the supply container 2 to undergo rotation, whereby the loading process can be facilitated and the operational efficiency of the device improved. This motion of the fluid in the supply container 2 is produced as follows. The compressed air reaches the 5-way control valve 23 by way of the pipe 27 and the stop valve 19 and from there passes through the pipe 28 into the cylinder 16. The piston 47 of the cylinder 16 is now urged downwards, the nonreturn valve 34 opens and the oil is forced out of the cylinder 16 through the pipe 32 and a nozzle 49 into the supply container 2. At the same time, the nonreturn valve 39 in the pipe 37 opens, so that the volume of oil displaced by the piston 47 of the cylinder 16 is collected by the cylinder 17. The oil flow is accelerated in the jet 49 and the oil in the supply container 2 is set in motion in the direction of the arrow (FIG. 2). The control valve 23 is then switched over and the compressed air flow over the pipe 29 into the cylinder 17, the piston of which is urged downwards. The nonreturn valve 39 thereby closes and the oil displaced from the cylinder 17 is sent through the nonreturn valve 38, the pipe 36 and a nozzle 50 into the supply container 2 and from there through a pipe 33 and the nonreturn valve 35 into the cylinder 16. The oil in the supply container 2 is set in motion in the direction of the arrow by the alternating action of the two cylinders 16, 17, whereby the workpieces in the supply container 2 are carried along and run over the orifice of the magazine channel 40. The workpieces lying correctly above the orifice of the magazine channel are "sucked into" the channel as a result of the to-and-fro motion of the motion of the oil produced in the cylinders 14, 15. The cylinder 16 is shown in cross section in FIG. 7. As is apparent from FIG. 7, the cylinder 16 is formed by a bore in the housing member 1, and the cover 4 at the same time forms the upper seal of the cylinder. The cylinder 16 can obviously be constructed differently, by way of example, it can consist of a tube which can be inserted in a bore of the housing. The piston 47 rests on the spring 48 and is so constructed that it forms a seal between the upper part of the cylinder 16 which is filled with compressed air and the lower part thereof which is filled with oil. In the middle of the cylinder there is an aperture 51 which is connected with a pipe 52, through which the compressed air which has filtered through the sleeve 53 of the piston 47 can escape.

An important advantage of the device described lies in the fact that it is also particularly suitable for loading elongated workpieces. FIGS. 5 and 6 show a storage magazine 3 constructed for accommodating such elongated workpieces, together with a workpiece 54 inserted in the magazine channel 40. The magazine 3 consists of two parts 3a and 3b in which the halves of the channel 40 are grooved. The contours of the workpiece 54 to be accommodated follow the outline of the magazine channel 40. A recess 55 is provided near the upper end of the magazine part 3a which connects the channel 40 to the pipe 30 by way of a bore 56. Owing to the to-and-fro movement of the oil in the supply container 2 and the magazine channel 40 which has already been described, the workpieces 54 lying upright at the orifice of the channel 40 are "sucked into" the channel 40 and move downwards. The workpiece 54 is thus only guided in the extension 58 of the channel 40 surrounding the shoulder 57 itself. If the oil is forced through the bore 56 and the recess 55 into the channel 40, then the workpiece 54 is urged downwards whilst the workpieces not lying upright at the orifice of the channel 40 are forced back into the supply container. As a result of the unilateral guidance, the workpiece 54 in the magazine channel 40 is forced sharply down during this period and this unilateral displacement of weight leads to the jamming of the shoulder 57 in the channel part 58. Therefore the whole system must be so designed that in the event of jamming the pressure exerted on the workpiece 54 does not lead to bending of the workpiece. With the present example, the maximum pressure allowed amounts to 1 kg./cm.² As is apparent from FIG. 4, the pipes 7 and 30 are connected to one another by way of a nonreturn valve 59. This forms an additional safeguard against exceeding the permitted pressure in the system. If in fact the orifice of the magazine channel 40 is blocked by workpieces lying incorrectly, so that the volume of oil displaced from the cylinder 15 cannot reach the cylinder 14, then the nonreturn valve 59 is opened when the pressure in the pipe 7 is greater than 1 kg./cm.² The oil then flows via the pipe 30 on the one side to the cylinder 14 and on the other to the magazine channel 40 and the supply container 2, so that the workpieces blocking the orifice of the channel 40 are thrust back into the supply container. During the aforementioned return flow of the oil in the magazine channel 40, the workpiece 54 is disengaged from the jammed position and moved slightly upwards. The previously described alternating action of the cylinders 14, 15 which is controlled by the control valve 22 causes the oil to move up and down in the magazine channel 40 beneath the orifice of the pipe 30, whereupon the workpieces in the channel 40 undergo a swinging motion so that they can slide downwards in suspension, so to speak. Thus with the device described above even elongated workpieces can be loaded fully automatically.

Another comparatively easily loading workpiece is illustrated in FIG. 8.

Figure 12:
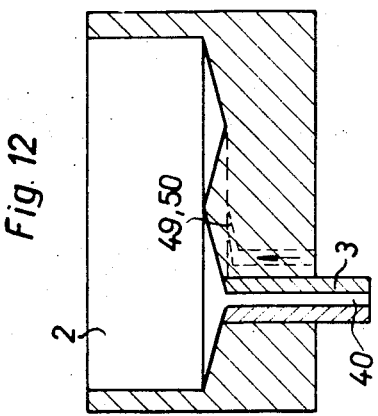
FIGS. 12 and 12a show a cross section and plan view of an additional supply container with a magazine.
Figure 12A:
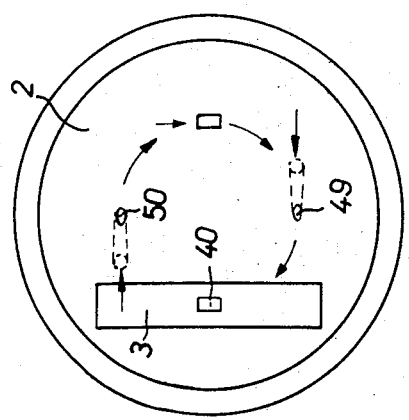
Figure 11:
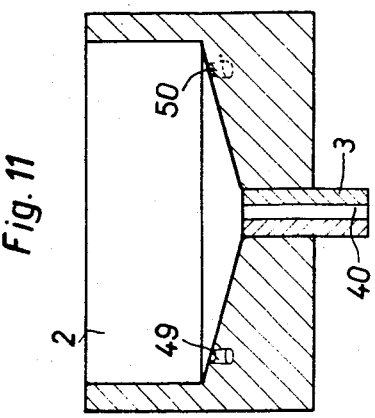
FIGS. 11 and 11a show a cross section and plan view of another supply container with a magazine.
Figure 11A:
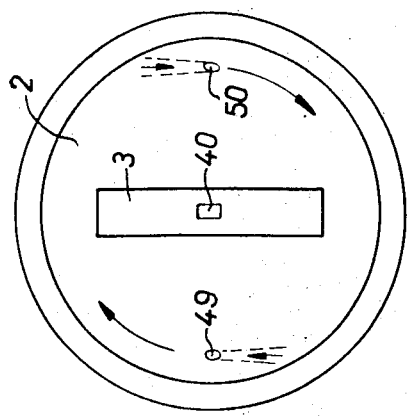

For loading large workpieces, the device can be provided with a large auxiliary supply container 60 (see FIGS. 9, 10). The cover 6 is then removed and the auxiliary supply container 60 screwed onto the lid 4. The auxiliary supply container 60 has a supply chamber 61 which collects the workpieces, an appliance 62 for feeding the workpieces from the supply chamber 61 to the supply container 2, as well as a piston arrangement 63 for actuating the feeding device 62. The supply chamber 61 has a filling hole 64 and an outlet hole 65. The filling hole 64 can be tightly sealed with the cover 6. The outlet hole 65 opens into a conveyor duct 66 which is connected with the filling hole 5 of the supply container 2. In the supply chamber 61 above the outlet hole 65, there is an inclined plate 67 which serves to take up the weight of the workpieces. The feeding device 62 consists of a wedge-shaped piston 67a which is arranged in the conveyor duct 66 and provided with a bore 68 at its rearward end, in which bore is located a compression spring 70 which is supported on the end surface 69 of the channel 66. Furthermore, a pin 71 is screwed into this end of the piston, which pin is connected with the piston arrangement 63 by means of a chain 74 which is guided over a cable pulley 73 which is secured in the casing 72. The spring 70 is so constructed that it always keeps the chain 74 in the stretched state. The piston arrangement 63 consists of a cylinder 75 in which is mounted a piston 77 resting on a compression spring 76. The spring 76 is supported in a plate 78 which is mounted at the lower end of the cylinder. The piston 77 is provided with a piston rod 79 which extends out over the cylinder and is connected at its lower end with the chain 74. A piston-rod packing in the form of an O-ring 80 is provided at the lower end of the cylinder 75 in order to prevent fluid from entering the cylinder 75 at the bottom. A vent pipe is provided at the lower end of the cylinder 75. The cylinder 75 is connected with the magazine channel 40 by way of the pipes 81, 82, a nonreturn valve 83 and a further pipe 84. The nonreturn valve 83 consists of a vertically-mounted extension of the pipe 84 in which a ball 85 is arranged so as to lie at the orifice of the pipe 84. The ball 85 is urged onto the orifice only by its own weight. When the supply container 2 is empty and the last workpiece in the magazine channel 40 has dropped beneath the orifice of the pipe 84, the oil is forced into the cylinder 75 by the pressure impulse caused by the cylinders 14, 15 and urges the piston 77 downwards. Thus the chain 74 is balanced and the spring 70 moves the piston 67a forward. The pile of workpieces lying on the inclined part, i.e., 62, of the piston 67a is thereby thrust into the supply container 2. When the magazine channel 40 is again filled up to the orifice of the pipe 84, the piston 77 is slowly pressed upwards by the compression spring 76 whereupon the oil is forced out of the cylinder 75 through the nonreturn valve 83, which is not completely closed, back into the channel 40. The piston 67a is thus withdrawn by the chain 74, the outlet hole 65 is again cleared and a new pile of workpieces slides into the conveyor duct and onto the inclined part 62 of the piston 67a. A pressure-equalizing pipe 86 is provided between the recess 85 and the supply chamber 61. Fully-automated operation for 15 hours is now possible with this auxiliary supply container 60. Various embodiments of the supply container 2 and various kinds of arrangements of the magazine are illustrated in FIGS. 11–13.

What is claimed is:

1. Apparatus for supplying workpieces to a working station, comprising a supply container provided with a filling hole, a magazine connected to the supply container and provided with a duct for the passage of the workpieces, said supply container and magazine duct being filled with liquid, and means for automatically loading the magazine with workpieces from the supply container, said loading means including two cylinders having pressure fluid controlled and actuated reciprocatory pistons therein, said cylinders being connected with said supply container and with said magazine duct to cause the liquid in the supply container and in the magazine duct to effect a reciprocating movement whereby the workpieces while passing along the magazine duct effect a to-and-fro motion in the direction of passage within the duct.

2. Apparatus according to claim 1, wherein two further pressure fluid controlled cylinders connected with said supply container are provided and are arranged to cause rotary movement of the fluid in the supply container in operation.

3. Apparatus according to claim 2, wherein said cylinders are connected in pairs with a pneumatic or hydraulic multiway control valve.

4. Apparatus according to claim 1, wherein said two cylinders for causing reciprocatory movement of the fluid are interconnected by way of a nonreturn valve arranged to prevent the occurrence of excess pressure in the system.

5. Apparatus according to claim 2, in which said supply container is associated with an auxiliary supply container.

6. Apparatus according to claim 5, wherein said auxiliary supply container has a supply chamber provided with an outlet opening, a conveyor duct connected with said outlet opening of the supply chamber and with said filling hole of the first mentioned supply container, and means for feeding workpieces from said conveyor duct to said first mentioned supply container.

7. Apparatus according to claim 6, wherein said means for feeding workpieces from the conveyor duct to said first mentioned supply container include a spring-loaded wedge-shaped piston arranged in the conveyor duct and a cylinder for actuating said piston.

8. Apparatus according to claim 7, wherein said actuating cylinder contains a reciprocatory piston and is connected with said magazine duct, said piston being actuable by means of said working liquid, said wedge-shaped filling piston and said piston of the actuating cylinder being interconnected by a flexible traction member guided over a pulley.

References Cited
UNITED STATES PATENTS

| | | | |
|---|---|---|---|
| 2,824,665 | 2/1958 | Lamouria | 302—14 |
| 2,915,165 | 12/1959 | Bell | 193—43 |
| 3,343,885 | 9/1967 | Lundeberg | 302—2 |
| 3,346,305 | 10/1967 | Heymann | 302—2 |

ANDRES H. NIELSEN, Primary Examiner

U.S. C. X.R.

193—43; 302—2